(12) United States Patent
Peng

(10) Patent No.: US 8,087,822 B2
(45) Date of Patent: Jan. 3, 2012

(54) LIQUID CONTAINER CAPABLE OF SELF-GENERATING POWER AND SHOWING TEMPRATURE

(76) Inventor: Wei-Lun Peng, Dasi Township, Taoyuan County (TW)

( * ) Notice: Subject to any disclaimer, the term of this patent is extended or adjusted under 35 U.S.C. 154(b) by 485 days.

(21) Appl. No.: 12/379,840

(22) Filed: Mar. 3, 2009

(65) Prior Publication Data

US 2010/0224639 A1 Sep. 9, 2010

(51) Int. Cl.
*G01K 17/06* (2006.01)
(52) U.S. Cl. .............. 374/33; 374/179; 374/208; 374/41
(58) Field of Classification Search .................. 374/100, 374/29, 32, 39, 43, 141, 147, 148, 109, 208, 374/170, 120, 121, 33, 34, 45, 179; 73/866.5; 99/DIG. 10, 646; 116/216; 136/200, 230
See application file for complete search history.

(56) References Cited

U.S. PATENT DOCUMENTS

| | | | | |
|---|---|---|---|---|
| 4,036,051 A | * | 7/1977 | Fell et al. ........................ | 374/39 |
| 4,793,323 A | * | 12/1988 | Guida et al. ............. | 126/263.08 |
| 2004/0255787 A1 | * | 12/2004 | Lassota et al. .................. | 99/275 |
| 2007/0163569 A1 | * | 7/2007 | Strachan .................. | 126/263.09 |

FOREIGN PATENT DOCUMENTS

| | | | |
|---|---|---|---|
| RU | 2154782 C2 | * | 8/2000 |
| SU | 587454 A | * | 2/1978 |
| SU | 615336 A | * | 6/1978 |
| SU | 901767 B | * | 2/1982 |

* cited by examiner

*Primary Examiner* — Gail Verbitsky
(74) *Attorney, Agent, or Firm* — Rosenberg, Klein & Lee

(57) ABSTRACT

A liquid container capable of self-generating power and showing temperature, comprising: a) a containing body consisting of a housing and an inner wall, a gap being formed between the housing and the inner wall; b) a circuit board positioned within the gap; c) a temperature sensor positioned in the gap for measuring the temperature of the contained liquid, the temperature sensor being electrically connected to the circuit board; d) a temperature indicator disposed in the gap and electrically connected to the circuit board, a displaying surface thereof being positioned on the surface of the housing; and e) a temperature difference power-generating element positioned within the gap and electrically coupled to the circuit board, a thermoelectric effect being created by the hot water filled into the space defined by the inner wall such that a thermal energy can be converted into the electric energy that is stored by an energy-accumulating element for providing the temperature indicator and the related elements with required power.

7 Claims, 3 Drawing Sheets

LIQUID CONTAINER CAPABLE OF SELF-GENERATING POWER AND SHOWING TEMPRATURE

BACKGROUND OF THE INVENTION

1. Field of the Invention

The invention relates to a liquid container capable of self-generating power and showing temperature, and more particularly, to a liquid container preventing burn injuries and to a power supply apparatus thereof.

2. Description of the Related Art

In the daily life, some containers such as cups, bowls, bottles, pots, etc. are used to contain liquid like water, milk, coffee, drink, etc. Some of them have a very high temperature. Sometimes, the user does not realize that it is a high temperature liquid and pours it into his mouth right away, thereby causing burn injuries. Therefore, it requires further improvements.

A conventional feeding bottle is provided with a mercury thermometer at one side thereof for detecting the temperature of the hot milk and therefore determining if the milk is too hot. However, the feeding bottle having mercury thermometer is not practical in use. For example, the scale is too small to identify at night. Moreover, the mercury is poisonous. It is dangerous if the feeding bottle falls to the ground. Therefore, it is not a practical design.

As shown in FIG. 1, a conventional cup holder 10 is provided with a temperature sensor and a temperature indicator 11. In placing a drink cup 12 into the cup holder 10, the temperature of the drink cup 12 will be shown for preventing the burn injuries. However, a battery 13 has to be fitted to the bottom of the cup holder 10 for providing the power required by the temperature indicator 11. Moreover, the batteries 13 are consumables and require a frequent replacement, thereby increasing the cost. Moreover, the cover 14 is not sealed and permits the penetration of water so that the cup holder 10 can't be cleaned. Therefore, only the drink cup 12 taken out of the cup holder can be cleaned. The drink cup 12 can be placed into the cup holder 10 only when it is dried. This causes much inconvenience. Although the drink cup 12 can be separately cleaned, it is also difficult to prevent the penetration of drink into the cup holder 10 in use. Accordingly, the cup holder 10 in need of the battery 13 or even the drink cup is not practical in use and requires further improvements.

SUMMARY OF THE INVENTION

An object of the invention is to provide a liquid container capable of self-generating power and showing temperature in which a self-generating system is created for achieving the power circulation and reutilization effect. Moreover, a safety monitoring effect is achieved by a temperature indicator positioned on the surface of the container for preventing the burn injuries.

Another object of the invention is to provide a liquid container capable of self-generating power that does not require batteries in use and can be entirely sealed for preventing the penetration of water. Like the other conventional containers, it is cleanable and washable.

A further object of the invention is to provide a liquid container capable of self-generating power that can be made in predetermined form without being limited to the conventional cup holder 10. Accordingly, the scope of application is broadened and becomes more practical.

In order to achieve the above-mentioned objects, a liquid container capable of self-generating power and showing temperature in accordance with the invention includes:

a) a containing body consisting of a housing and an inner wall, a gap being formed between the housing and the inner wall;

b) a circuit board positioned within the gap;

c) a temperature sensor positioned in the gap for measuring the temperature of the contained liquid, the temperature sensor being electrically connected to the circuit board;

d) a temperature indicator disposed in the gap and electrically connected to the circuit board, a displaying surface thereof being positioned on the surface of the housing; and e) a temperature difference power-generating element positioned within the gap and electrically coupled to the circuit board, a thermoelectric effect being created by the hot water filled into the space defined by the inner wall such that a thermal energy can be converted into the electric energy that is stored by an energy-accumulating element for providing the temperature indicator and the related elements with required power.

BRIEF DESCRIPTION OF THE DRAWINGS

The accomplishment of this and other objects of the invention will become apparent from the following descriptions and its accompanying figures of which.

DETAILED DESCRIPTION OF THE PREFERRED EMBODIMENT

Figure 1:
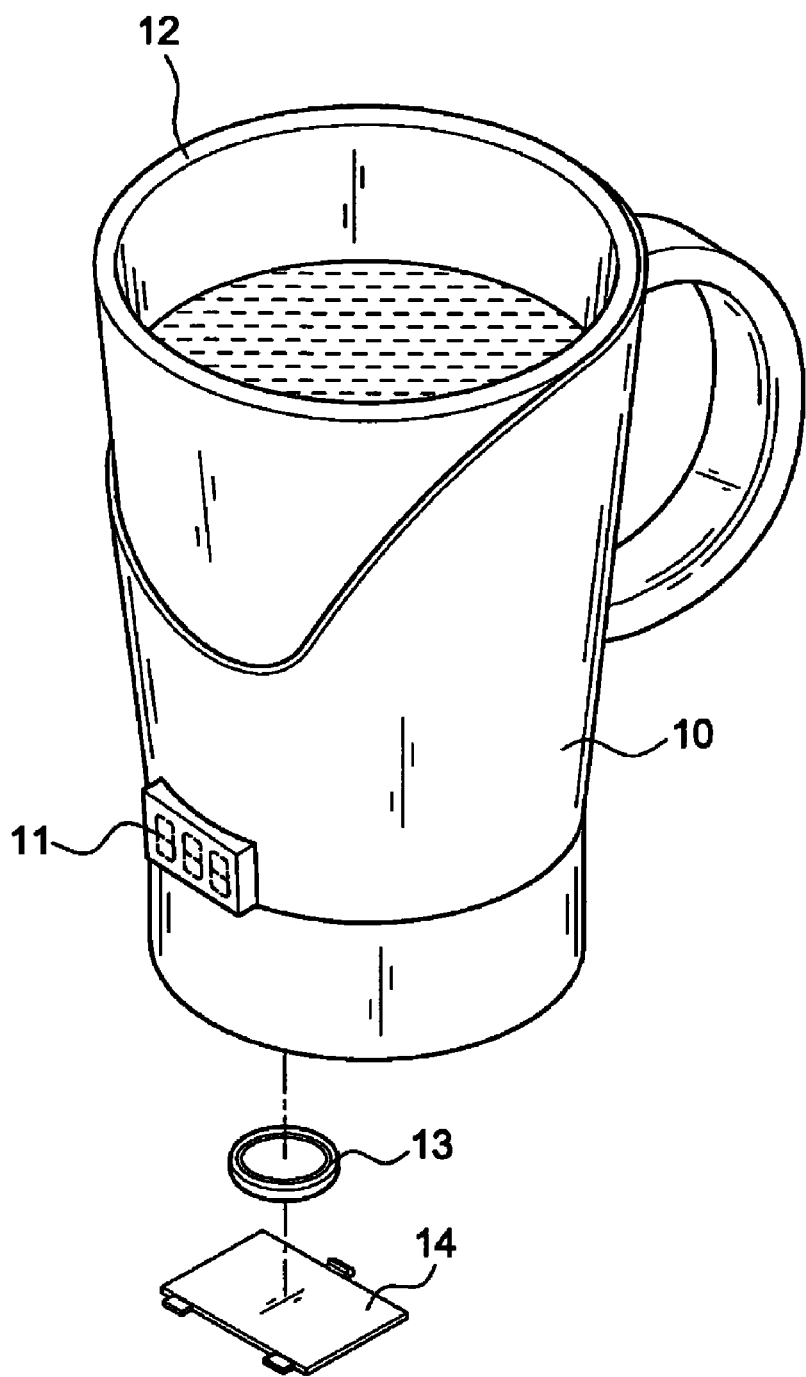
FIG. 1 is a perspective view of a conventional drink cup holder with the function of showing the temperature of the drink.
Figure 2:
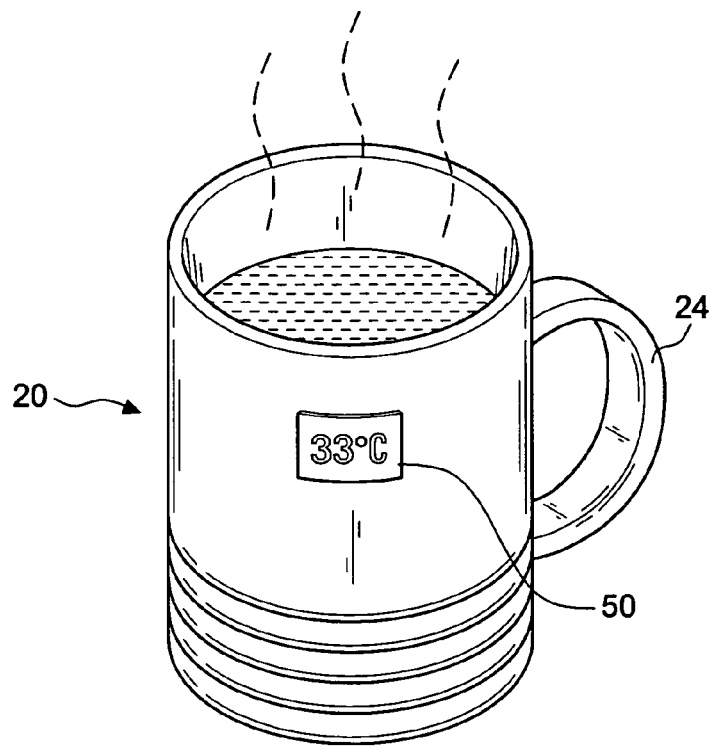
FIG. 2 is a perspective view of a liquid container capable of self-generating power and showing temperature in accordance with the invention.
Figure 3:
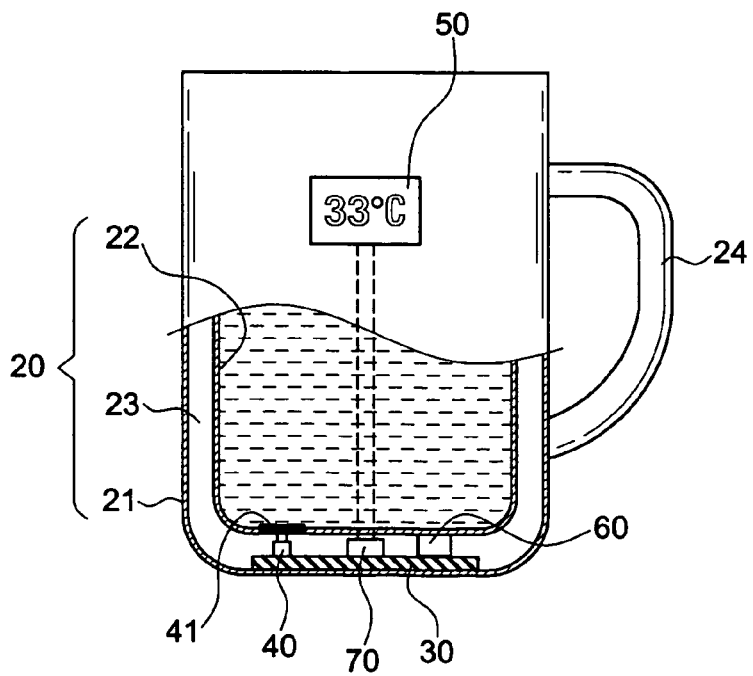
FIG. 3 is a cutaway view of a liquid container capable of self-generating power and showing temperature in accordance with the invention.

First of all, referring to FIGS. 2 through 5, an embodiment of a liquid container capable of self-generating power and showing temperature in accordance with the invention includes a containing body 20, a circuit board 30, a temperature sensor 40, and a temperature indicator 50.

The containing body 20 consists of a housing 21 and an inner wall 22. A gap 23 is formed between the housing 21 and the inner wall 22 like a conventional vacuum cup. The containing body 20 can be made of metal or nonmetal material. The fabrication thereof belongs to the prior art so that no further descriptions thereto are given hereinafter.

The circuit board 30 is positioned in the gap 23. According to the embodiment, the circuit board 30 is disposed at the bottom of the inner wall 22, but should not be limited thereto.

The temperature sensor 40 is positioned in the gap 23 for measuring the temperature of the contained liquid. Moreover, the temperature sensor 40 is electrically connected to the circuit board 30. According to the embodiment, the temperature sensor 40 is disposed at the bottom of the inner wall 22 such that it can be positioned as closely as possible to the liquid to measure. The rim of the temperature sensor 40 can be sealed with water-resisting material 41 for preventing the penetration of water. The temperature sensor 40 can be disposed close to the bottom of the inner wall 22 as well. The error in measuring the temperature of the liquid through the material of the inner wall 22 lies within the permissible range. This won't be described more hereinafter.

The temperature indicator 50 is disposed in the gap 23 and electrically connected to the circuit board 30. Moreover, the temperature indicator 50 includes a displaying surface that is positioned on the surface of the housing 21 for showing the liquid temperature detected by the temperature sensor 40. The temperature indicator 50 includes an LCD panel for showing the temperature value like 33° C. Alternatively, the temperature indicator 50 can be LED panel for showing the temperature levels with different colors. For example, the red color stands for high temperature, the green color stands for low temperature, etc. In other words, the warning and showing effects are achieved by different colors.

Figure 4:
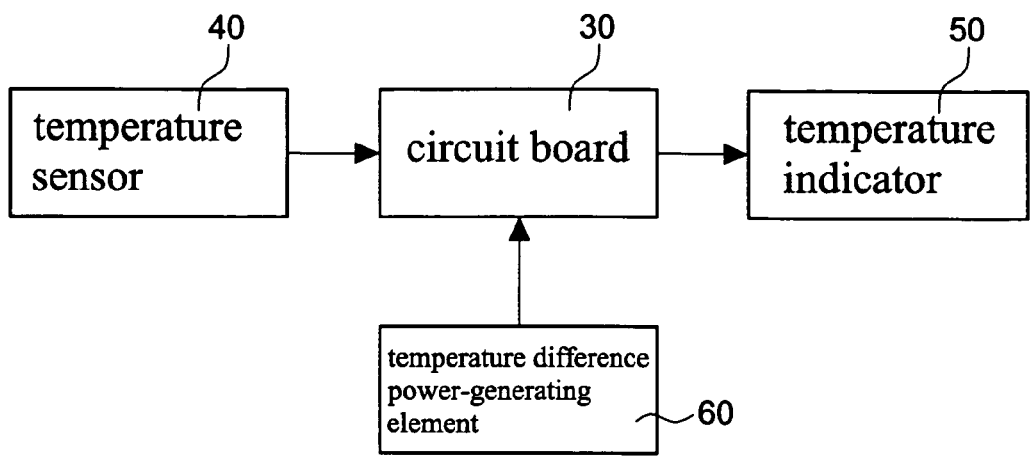
FIG. 4 is a block diagram of the circuit in accordance with the invention.
Figure 5:
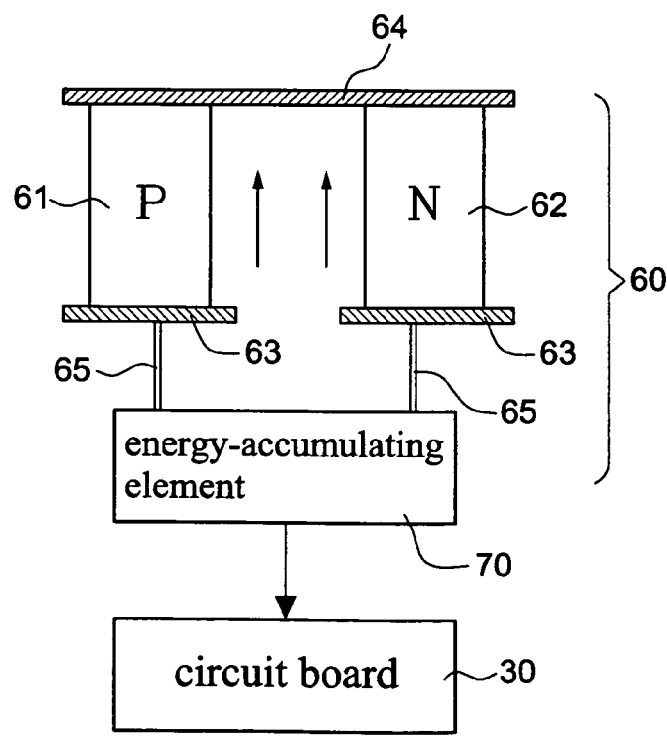
FIG. 5 is a block diagram of the structure of a temperature difference power-generating element in accordance with the invention.

As shown in FIGS. 4 and 5, the above-mentioned electronic components must provide a power device for a smooth detection and display. As a result, a temperature difference power-generating element 60 is positioned within the gap 23 and electrically coupled to the circuit board 30. A thermoelectric effect is created by the hot water filled into the space defined by the inner wall 22 such that a thermal energy can be converted into the electric energy that is stored by an energy-accumulating element 70 for providing the temperature indicator 50 and the related elements with required power.

According to the embodiment, the temperature difference power-generating element 60 includes, but not limited thereto, a high temperature chilling chip consisting of a p-type semiconductor 61 and a n-type semiconductor 62 spaced apart from each other. A high temperature surface insulation substrate 63 and a low temperature surface insulation substrate 64 are positioned at the bottom and the top thereof. The high temperature surface insulation substrates 63 of the p-type semiconductor 61 and the n-type semiconductor 62 are spaced apart from each other. Moreover, one side of the high temperature surface insulation substrates 63 is connected with a conducting wire 65 for delivering the positive and the negative electricity. In other words, a temperature difference between the high and low temperature surface insulation substrates 63, 64 is created when the high temperature surface insulation substrate 63 collects the heat of the inner wall 22 (the direction pointed by the arrow) and the temperature of the low temperature surface insulation substrate 64 is relatively low. In this way, a magnetic field is created nearby. In addition, an electromotive force exists in the loop of the conducting wires 65 connected at one side of the high temperature surface insulation substrates 63, thereby producing the thermoelectric effect. Therefore, the conversion of thermal energy into electric energy takes place, thereby producing a self-generating system. Therefore, the electric power is delivered via the circuit board 30 to the electric elements.

Accordingly, the liquid container in accordance with the invention may achieve the self-generating effect without use of the batteries. In this way, the design and the application scope become wider since the containing body 20 may be constructed in certain form or dimensions such as cups, bowls, bottles, etc. Moreover, some containers can be provided with a handle 24. Thus, the design of the invention may achieve the effect in safety and in use.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A liquid container capable of self-generating power and showing temperature, comprising:
   a) a containing body consisting of a housing and an inner wall, a gap being formed between the housing and the inner wall;
   b) a circuit board positioned within the gap;
   c) a temperature sensor positioned in the gap for measuring the temperature of the contained liquid, the temperature sensor being electrically connected to the circuit board;
   d) a temperature indicator disposed in the gap and electrically connected to the circuit board, a displaying surface thereof being positioned on the surface of the housing; and
   e) a temperature difference power-generating element positioned within the gap and electrically coupled to the circuit board, a thermoelectric effect being created by the hot water filled into the space defined by the inner wall such that a thermal energy can be converted into the electric energy that is stored by an energy-accumulating element for providing the temperature indicator and the related elements with required power.

2. The liquid container capable of self-generating power and showing temperature as recited in claim 1 wherein the temperature sensor is disposed at the bottom of the inner wall and sealed for preventing the penetration of water.

3. The liquid container capable of self-generating power and showing temperature as recited in claim 1 wherein the temperature indicator includes an LCD panel for showing the temperature value.

4. The liquid container capable of self-generating power and showing temperature as recited in claim 1 wherein the temperature indicator includes an LED panel for showing the temperature levels with different colors.

5. The liquid container capable of self-generating power and showing temperature as recited in claim 1 wherein the temperature difference power-generating element includes a high temperature chilling chip consisting of a p-type semiconductor and a n-type semiconductor spaced apart from each other, and wherein a high temperature surface insulation substrate and a low temperature surface insulation substrate are positioned at the bottom and the top thereof, and wherein the high temperature surface insulation substrates of the p-type semiconductor and the n-type semiconductor are spaced apart from each other; moreover, one side of the high temperature surface insulation substrates is connected with a conducting wire for delivering the positive and the negative electricity.

6. The liquid container capable of self-generating power and showing temperature as recited in claim 1 wherein the containing body is constructed in certain form or dimensions.

7. The liquid container capable of self-generating power and showing temperature as recited in claim 6 wherein the containing body further includes a handle.

* * * * *